July 10, 1956　　A. S. SCHMIDT ET AL　　2,753,907
SLICING MACHINE FOR MAKING VERTICAL AND
HORIZONTAL SLITS IN BUN CLUSTERS
Original Filed Dec. 8, 1948　　6 Sheets-Sheet 2
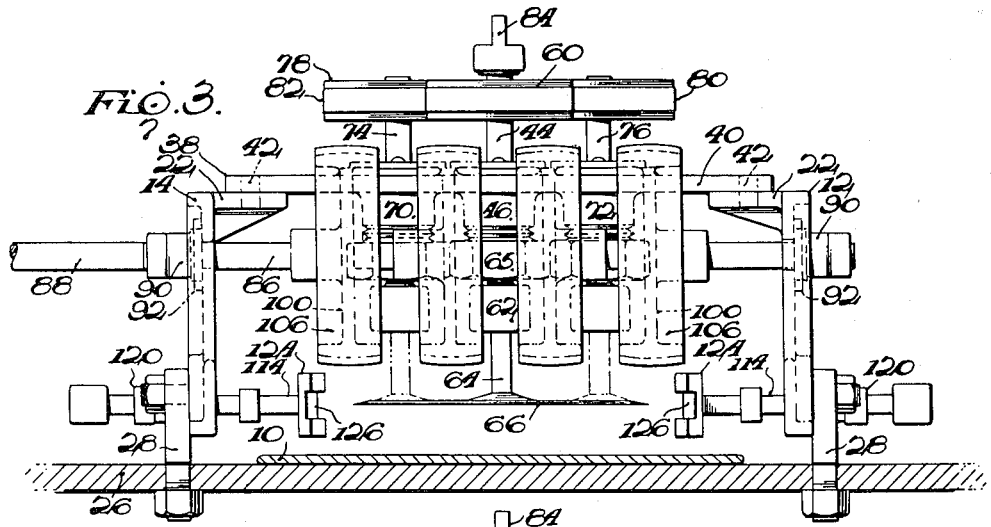
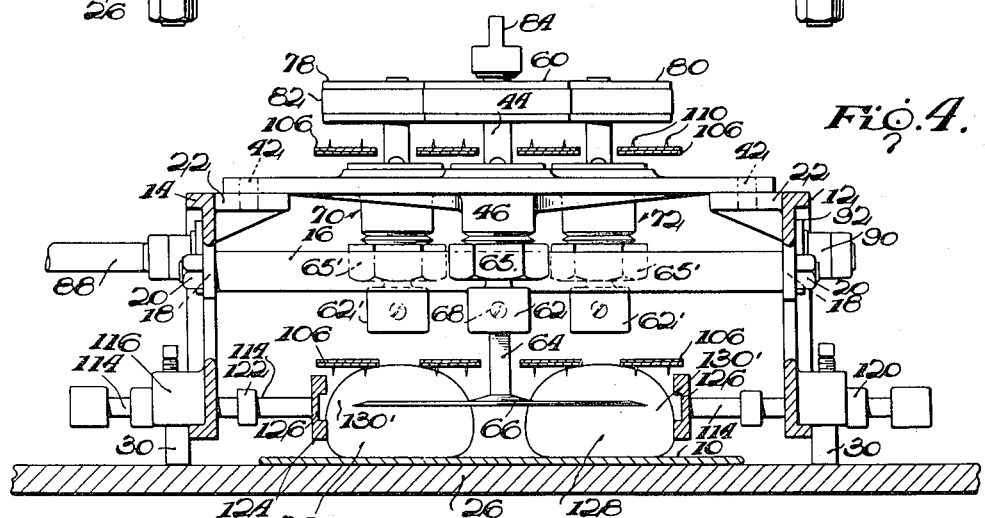
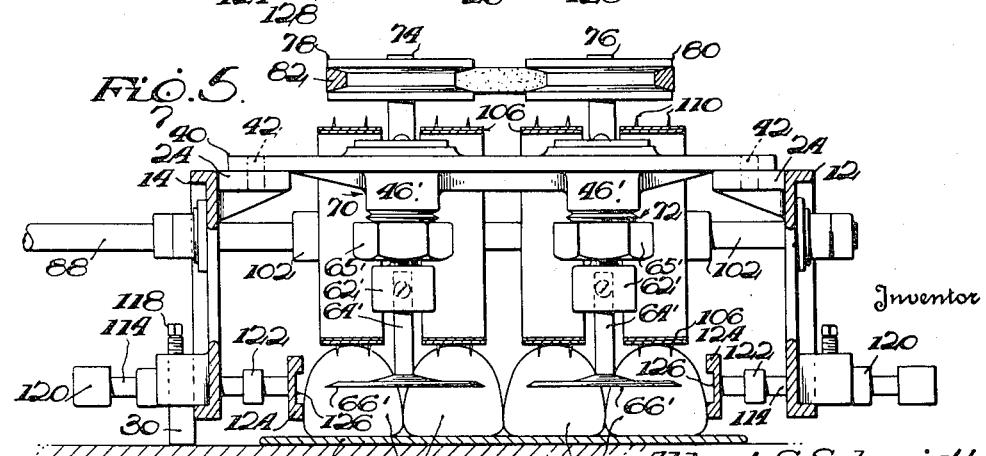

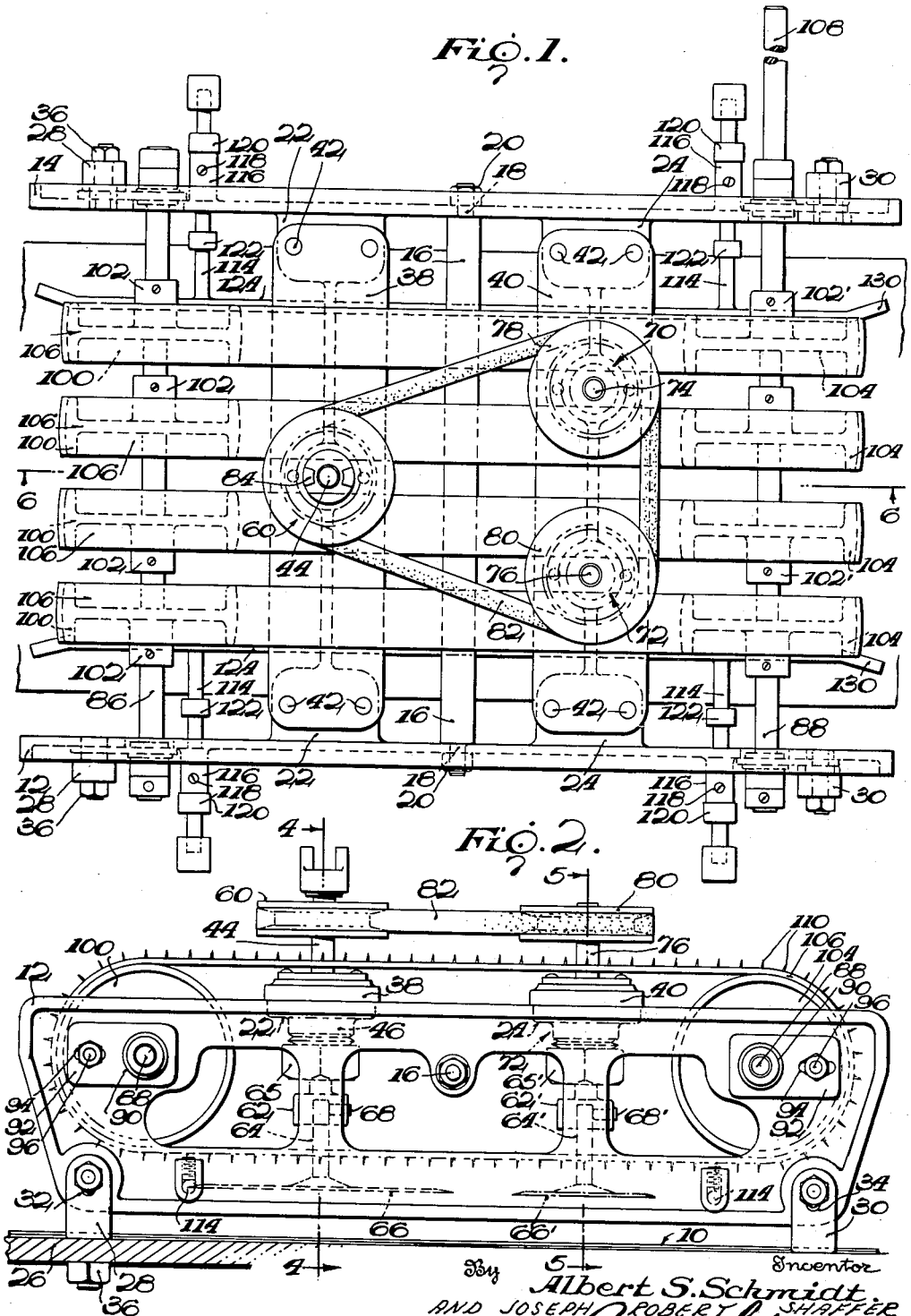

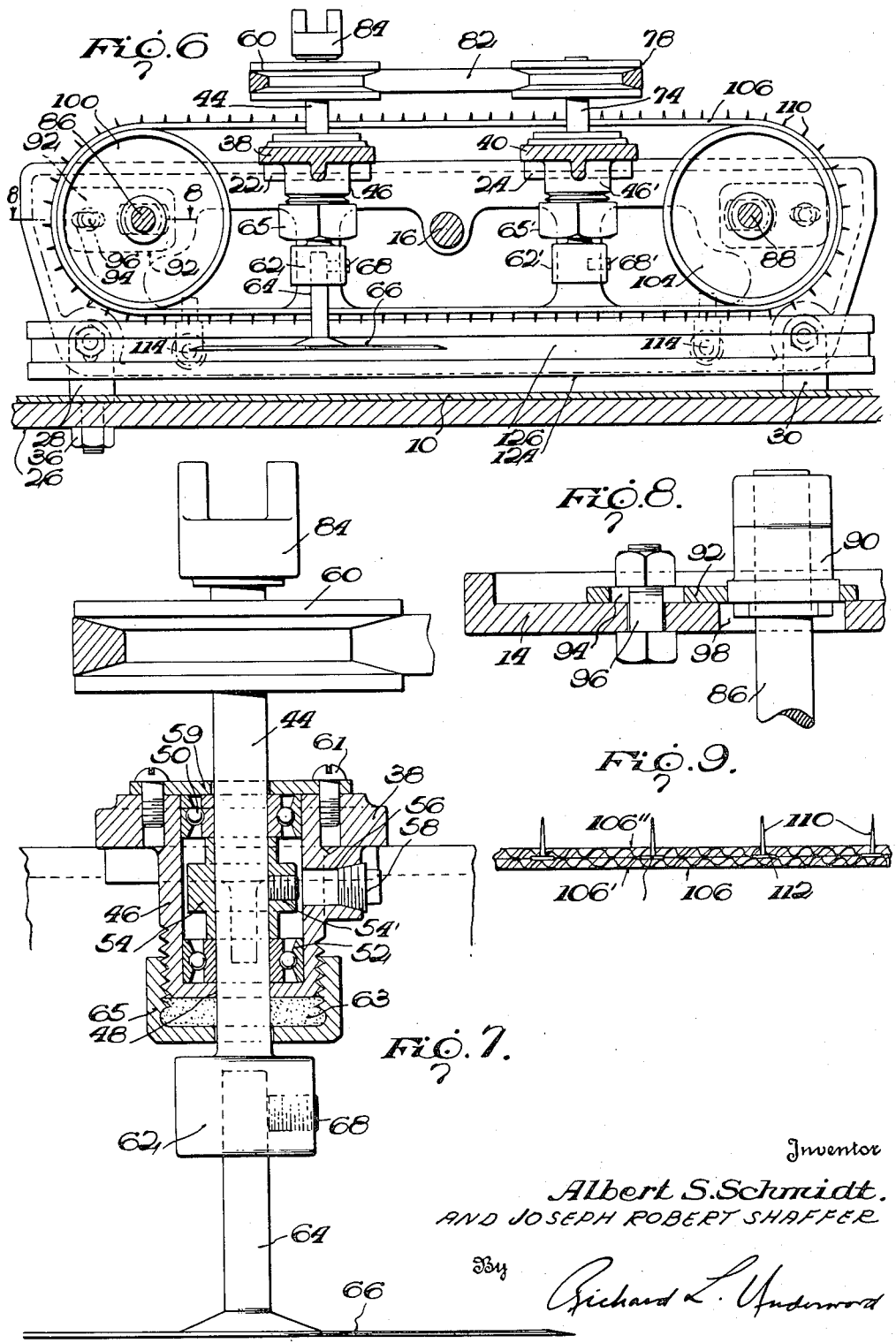

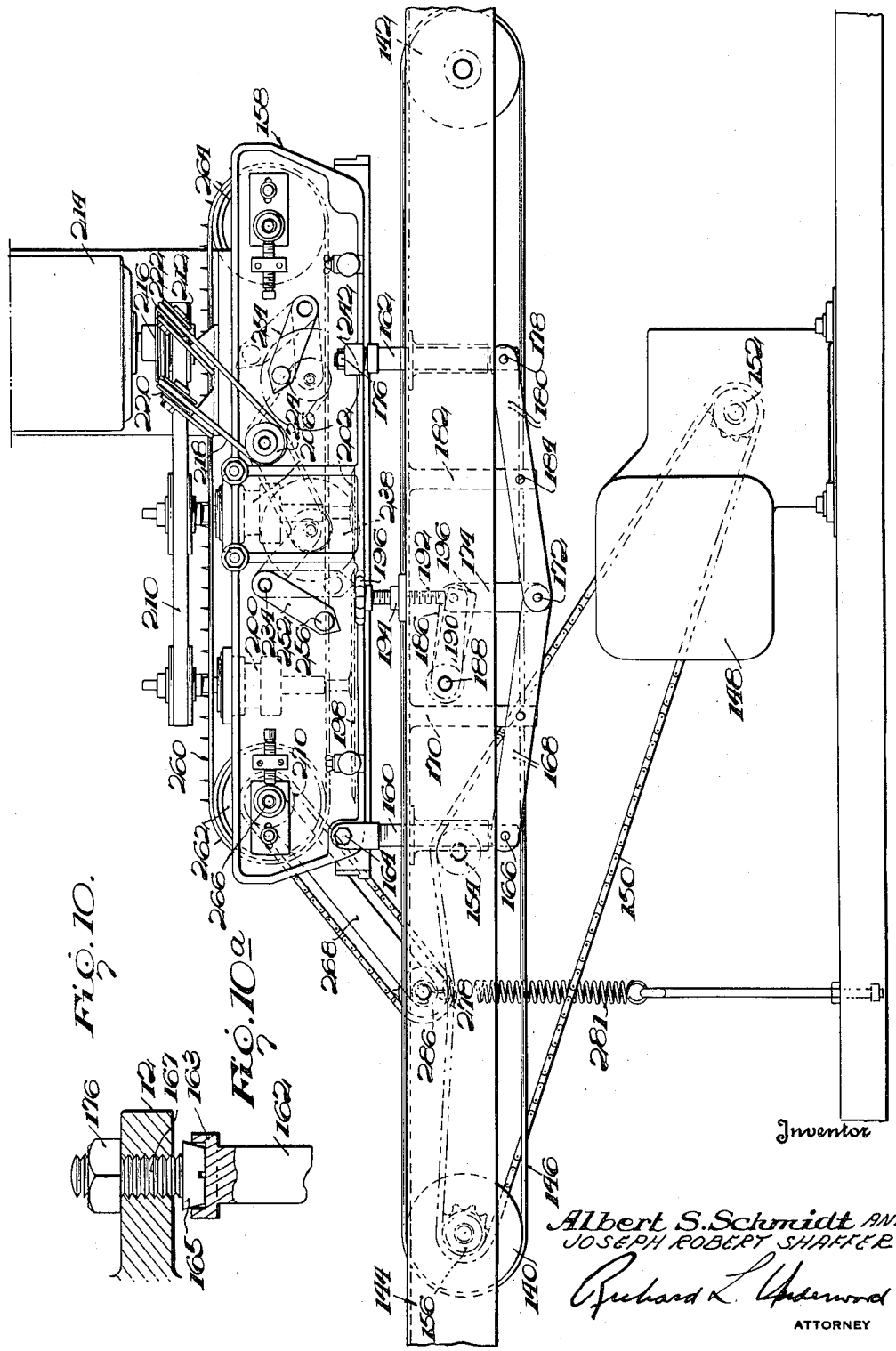

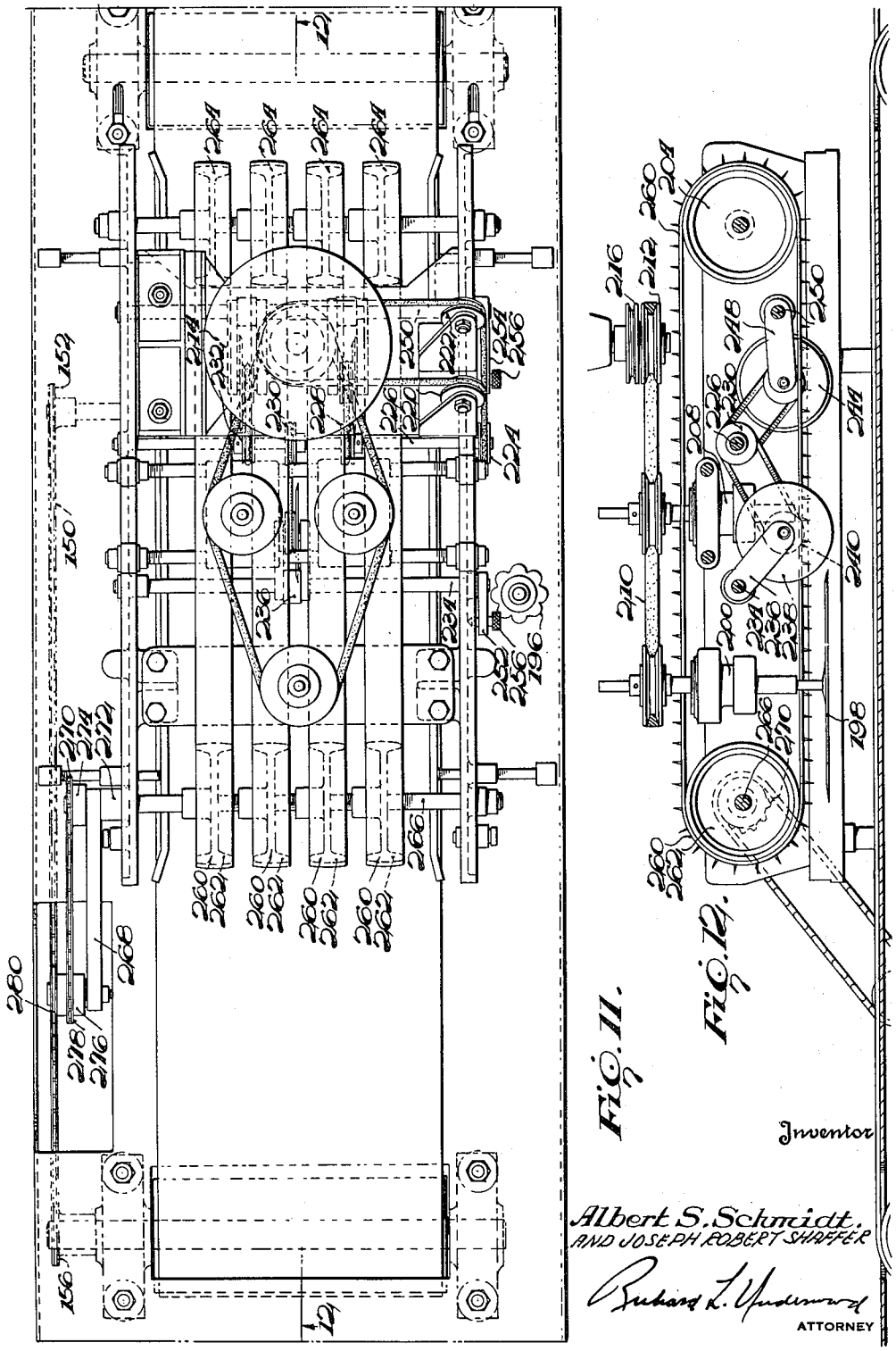

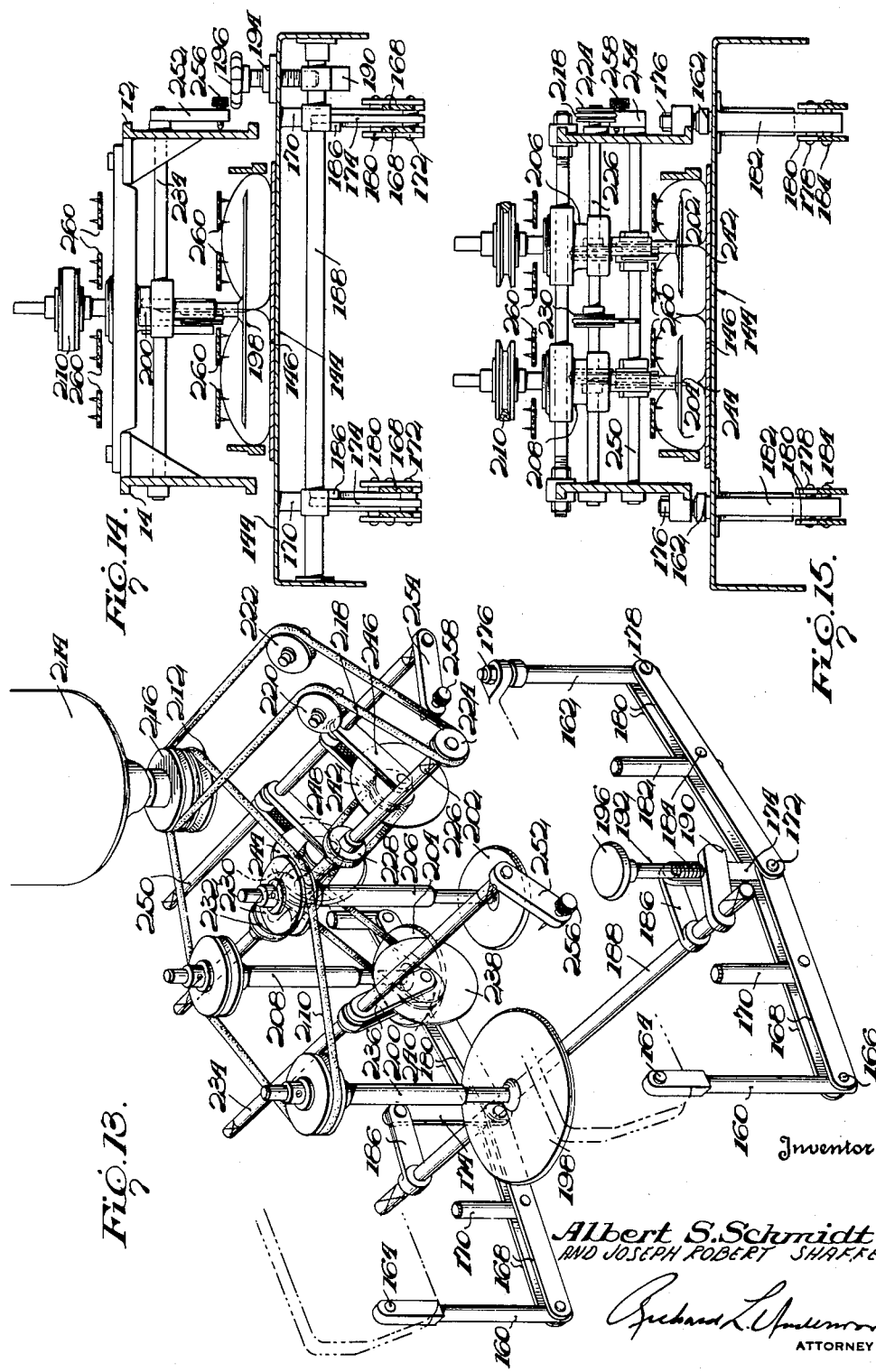

United States Patent Office 2,753,907
Patented July 10, 1956

2,753,907

SLICING MACHINE FOR MAKING VERTICAL AND HORIZONTAL SLITS IN BUN CLUSTERS

Albert S. Schmidt and Joseph Robert Shaffer, Harrisburg, Pa.; said Shaffer assignor to said Schmidt Original application December 8, 1948, Serial No. 64,073, now Patent No. 2,669,269, dated February 16, 1954. Divided and this application May 2, 1952, Serial No. 285,746

10 Claims.  (Cl. 146—78)

This invention relates to slicing machines and has particular reference to a machine for slicing bakery products, such as buns, rolls, etc. This application is a division of the copending application Serial No. 64,073 filed December 8, 1948, now Patent No. 2,669,269, issued to Albert S. Schmidt February 16, 1954, for Rotary Disc Slicer for Slicing a Plurality of Rows of Rolls.

Frequently it is desirable to slice wide flat rolls and long thin rolls, which are sometimes designated hamburger rolls and frankfurter rolls, respectively, in such manner that the slice does not extend entirely through the roll, leaving a solid portion at one edge which functions as a hinge for the separated portions of the roll. At the same time it is often advantageous to slice the rolls entirely through their body portion, forming two separate and independent sections.

An object of this invention is to so arrange a slicing machine that it is adapted for use in conjunction with standard traveling conveyors customarily used in bake shops and may be used to sever or slice the rolls completely into separate and independent sections or to sever them but partially, leaving a hinge portion at one edge as described above.

Still another object of the invention is to speed up the process of slicing rolls in the manner aforesaid and improve the efficiency with which that operation is performed. To that end the invention embodies means for slicing a plurality of rolls simultaneously and readily adjustable mechanism for adapting the machine to slice rolls of different dimensions, such as the two types referred to above.

Still another object of the invention is to eliminate spoilage resulting from faulty slicing and tearing of the baked product, thus insuring uniformity of sliced product.

Important features of the invention reside in the simplicity and lightness of the parts utilized, rendering adjustability for various purposes a simple and rapid operation and permitting easy cleansing of the machine and ready access to the various parts for repair purposes.

Various other objects and meritorious features of the invention will be apparent from the following description taken in conjunction with the drawings, wherein like numerals refer to like parts throughout the several figures, and wherein:

Fig. 1 is a top plan view of our improved machine;
Fig. 2 is a side elevation;
Fig. 3 is an end elevation;
Fig. 4 is a section through 4—4 of Fig. 2;
Fig. 5 is a section through 5—5 of Fig. 2;
Fig. 6 is a longitudinal section through 6—6 of Fig. 1;
Fig. 7 is an enlarged detail section of one of the mountings for the cutter discs;
Fig. 8 is an enlarged detail section through 8—8 of Fig. 6;
Fig. 9 is an enlarged view of one important element of the machine;

Fig. 10 is a side elevation of a modified arrangement especially suited for handling roll clusters;
Fig. 10a is an enlarged section through one of its frame supporting legs;
Fig. 11 is a top plan view of Fig. 10;
Fig. 12 is a section along 12—12 of Fig. 11;
Fig. 13 is a schematic view in perspective of the slicing mechanism and actuating means therefor;
Fig. 14 is an end view of the mechanism as set for handling large rolls, and
Fig. 15 illustrates the mechanism as set for handling small rolls.

The machine is adapted to be superimposed over a traveling conveyor 10 on which rolls or other baked goods are fed to the slicing machine and subsequently withdrawn for packaging after the slicing operation has been performed. The machine itself embodies a frame including duplicate oppositely disposed side walls 12 and 14. These walls are made of light metal and are preferably apertured as shown to reduce the weight of the elements as much as possible without sacrificing strength where necessary. The two side walls are secured together in spaced-apart relation by a central tie rod 16 having reduced portions 18 at opposite ends seated in openings in the walls and held therein by means of nuts 20. Each side wall is provided at spaced points along its length and at the top margin with inwardly extending supporting flanges 22 and 24 which are adapted to support cross pieces to be described more particularly hereinafter.

The frame of the machine is pivotally secured at one end to a bed support 26 by hinge members 28 and the other end is supported by leg members 30 which rest upon the bed support. The hinge members and leg members are oppositely disposed at each end of the frame and are bolted to the lower corners of the side walls through slots 32 and 34, respectively, in the hinge and leg members. Securement to these corner supports through the slots 32 and 34 permits vertical adjustment of the frame with reference to the bed support. The entire machine may be pivoted about hinge members 28. This facilitates ready removal and substitution of parts in a manner and for a purpose to be described more in detail. The frame and the bed support therefore provide a foundation which may be generally termed a base structure upon which the various operating elements of the instant combination may be conveniently mounted.

Cross braces 38 and 40 are secured, respectively, to oppositely disposed flanges 22 and 24 of the side walls as by means of bolts 42. Centrally disposed on cross brace 38 is a bearing asesmbly (see Fig. 7) in which shaft 44 is vertically journaled. The assembly consists of a depending cup 46 formed integrally with cross brace 38 and externally threaded at its lower end, the bottom of the cup being provided with an opening 48 to receive the shaft 44. Upper and lower bearings 50 and 52 are seated inside the cup with the aid of a spacing collar 54, the central portion of which is enlarged and provided at one point in its circumference with a threaded opening 54' adapted to receive a set screw, thereby permitting vertical adjustment of shaft 44 in the bearing assembly. An opening 56 in an enlarged portion of the cup wall is adapted to receive a standard pipe plug 58 which may be removed to provide access to the set screw when vertical adjustment of shaft 44 is desired. Bearing cap 59 is bolted as indicated at 61 to the cross brace 38 at the upper end of the bearing assembly. Packing material 63 surrounds shaft 44 below the cup 46 and is held securely in position by packing nut 65. This prevents lubricant from falling upon articles passing through the machine.

Integral with shaft 44 adjacent its upper end is a pulley 60 and the lower end of the shaft is enlarged as indicated at 62 and provided with a cylindrical opening to receive the spindle 64 of a cutting disc 66. The spindle may be secured in its seat at the lower end of the shaft by means of a set screw 68, thus permitting substitution of cutting discs varying in diameter or other characteristics.

Cross brace 40 is provided with two bearing assemblies designated broadly by the numerals 70 and 72, which may be identical in every respect with the assembly heretofore described in detail, for journaling vertical shafts 74 and 76. These shafts are provided at their upper ends with pulleys 78 and 80. An endless belt 82 extending around the three pulleys permits all shafts to be driven simultaneously from a single drive connection 84 which may be associated with one of the shafts, here the shaft 44. Each of the shafts 74 and 76 is provided with means heretofore described in conjunction with shaft 44 for detachably securing the spindle of a cutting disc to its lower end.

Pulley supporting shafts 86 and 88 are journaled in the side frames adjacent opposite ends thereof in a manner clearly illustrated in Fig. 8 wherein the end of pulley shaft 86 is supported in a bearing member 90 which is positioned in bearing plate 92. The bearing plate is provided adjacent the opening in which the bearing 90 is received with an elongated slot 94 through which it is secured by bolt 96 to the side wall 14. By virtue of the elongated slot 94 in the bearing plate and an elongated opening 98 in side wall 14 through which pulley shaft 86 passes, the bearing plate may be moved horizontally to adjust the pulley shaft longitudinally of the frame for purposes more clearly to be described hereinafter.

A series of four pulleys 100 are fixedly secured in spaced relation to one another upon shaft 86 by means of laterally extending hubs 102 with which set screws are associated. A similar number of pulleys 104 are secured to pulley shaft 88 in the same manner and the pulleys of each series are longitudinally aligned with one another for the reception of endless belts 106.

Pulley shaft 88 is extended beyond side wall 14 as indicated at 108, the extended portion of the shaft being adapted for engagement or connection with a power source which may be governed so that the linear speed of the endless belts is such as to synchronize its movement with that of the surface of the conveyor moving under the slicing machine frame and between its side walls.

An important feature of the invention resides in the fact that the belt has associated with it means whereby the article being conveyed under the machine is positively engaged and held in position upon the conveyor surface as it is moved by the latter past the cutting discs. This insures a uniform cut or slice and precludes the spoilage which occurs if the article is permitted to move or change its position from a controlled path in which it is directed past the slicing mechanism. Preferably this gripping or engaging means consists of a series of spaced spikes or prongs 110 extending outwardly from the belt and normal to the plane of its surface. Such an arrangement may be in the form of a belt comprising laminations 106′ and 106″, the heads 112 of the spikes or prongs being held firmly between the laminations as clearly shown in Fig. 9.

Guides extending linearly along the side margins of the traveling conveyor and lying in a plane above the same are adjustably positioned by the frame and serve to control the path of the articles being fed by the conveyor past the cutting discs of the slicing machine. In the form illustrated rods 114 are slidably received through openings in bosses 116 positioned near the base of each side wall at each end thereof, a set screw 118 serving to fixedly position each rod within its supporting boss at any position to which it is adjusted. Knobs 120 and 122 positioned on each rod 114 on opposite sides of its bearing in the boss serve to limit the sliding movement of each rod inwardly and outwardly with reference to the frame side wall.

Secured to the inner ends of the rods 114 associated with each side wall is a guide member 124, the inner face of each of which is grooved longitudinally along its median line as indicated at 126. Thus it will be seen that inward and outward sliding movement of the rods 114 on each respective side of the slicing machine serve to determine the width of the passage through which articles being conveyed under the machine by the conveyor is limited.

As has heretofore been stated, the machine is designed to slice articles of varying size and configuration, particular attention being directed to the flat hamburger type of roll and the long narrow frankfurter type of roll. The cutter disc drive shafts journaled, respectively, in the cross braces 38 and 40 are arranged in a particular configuration with reference to the belts 106 and their respective oppositely disposed pulleys 100 and 104. The drive shaft 44 extends between the two innermost belts 106 and shafts 74 and 76 pass, respectively, through the two outermost spaces between the four parallel belts. Thus the shafts 44, 74 and 76 form the apices of a triangle lying in a plane transverse to the axis of the shafts. The shaft 44 is designed to rotate a large cutting disc 66 and the two transversely aligned shafts 74 and 76 are designed to simultaneously rotate two smaller cutting discs such as 66′. As heretofore pointed out, all of the discs are detachably secured to the drive shafts and the shafts themselves are vertically adjustable in their respective journals.

When cutting the large flat type of roll commonly known as a hamburger roll, particular reference being made to Fig. 4, the two smaller cutting discs 66′ are uncoupled from their respective drive shafts 74 and 76 and the large disc 66 secured to drive shaft 44 is used alone. The rolls or buns 128 as they move on the conveyor toward the slicing machine are forced inwardly by the flared end portions 130 of guides 124, which have been moved inwardly to provide the proper marginal guides, so that two columns of rolls will move under the two inner belts 106. As the rolls continue to move forward, the engaging means or prongs 110 on the outer face of these belts will move down into the respective rolls and, the belts 106 being driven in synchronism with the movement of the conveyor, the rolls will be held firmly upon the conveyor during their passage past the cutter disc 66. After passing through the machine the prongs move upward out of engagement with the sliced rolls, which are carried on by the conveyor to some other point for a subsequent operation.

In the operation illustrated by Fig. 4, the rolls are so positioned that the cutting disc slices only partially through each roll of each parallel column of rolls, leaving a hinge portion 130. If the roll is to be sliced entirely and no hinge portion provided, the guides 124 are set more closely together, forcing the rolls of each parallel column moving under the slicing machine inwardly so that the cutting disc 66 will slice through the entire body of each roll. The grooves 126 are in the same transverse plane as the cutting disc and the peripheral margin of the disc may enter the grooves during the cutting operation when the guides 124 are set for the complete slicing operation.

Where relatively long and narrow rolls, such as frankfurter rolls 129, are to be sliced, the cutting disc 66 is removed and the two smaller discs 66′ are secured to drive shafts 74 and 76. This operation is illustrated in Fig. 5 and the guides 124 are so set that, as the conveyor moves the rolls under the slicing machine, each of the four pulley belts constituting the gripping or positioning means independently engages the rolls to form four columns. As explained with reference to Fig. 4, the guides 124 may be moved inwardly to compress the rolls of the four columns somewhat more when a full-slice operation is to be performed and the peripheral margins of the cutter discs 66′ may penetrate into the grooves 126 of the oppositely disposed guides.

By virtue of the hinge mounting of the entire machine at one end on hinges 28, the machine may be lifted at the other end for ready detachment and attachment of the desired cutting discs for each individual operation.

The vertical adjustability of the frame with reference to the hinge supports 28 and the legs 30 permits bodily vertical adjustment of the entire machine and, of course, the vertical adjustability of each of the drive shafts for the cutter discs all combine to provide a wide range of adjustability for operating on articles of different sizes and contours. This range is greatly facilitated for lateral or transverse adjustments by the readily adjustable manner in which the guides 124 are mounted.

From the foregoing it will be seen also that all parts are readily accessible for replacement and repair and easy access is provided for cleaning purposes. The weight of the machine is kept to a minimum by virtue of the apertured side frames and the skeleton-like formation obtained by the two cross braces which provide the journals for the cutter disc drive shafts. The ready adjustability of the pulley shafts 86 and 88 in a longitudinal direction for tightening or loosening the belt 106 permits conforming the gripping surfaces of the belts in the most feasible manner with the articles being passed under and along with it by the conveyor belt.

Frequently rolls are baked in groups or clusters as distinguished from separate units. A cluster may comprise a double row of the larger or hamburger rolls or a quadruple row of the smaller or frankfurter rolls. Under such circumstances it is desirable to provide means in conjunction with the slicing mechanism heretofore described for severing or separating, partially or wholly, the units of these clusters prior to passing them through the horizontal slicing discs. The spindle of the horizontal slicing disc to which adjacent rolls of the cluster are next subjected passes through this line of severance.

In this embodiment improved means are also provided for quickly and easily elevating the entire slicing head by manipulation of a single adjusting element which raises or lowers the four corner supports of the frame. In addition we have disclosed in conjunction with the arrangement illustrated in Figs. 10–15 means whereby the linear speed of the conveyor belt on which the rolls are carried through the slicing machine is conformed exactly to the linear speed of the endless belts which engage the top of the rolls to hold them firmly upon the conveyor support during such passage.

Referring now particularly to the arrangement illustrated in Figs. 10–15, rollers 140 and 142 are journaled at opposite ends of a bed support 144 and serve to carry an endless conveyor 146 upon which the roll clusters are moved through the slicing machine as heretofore described. The conveyor is driven by motor 148 through a roller chain 150 which passes over sprocket wheel 152 of the motor, an idler sprocket 154, and sprocket 156 secured to the end of the shaft upon which roller 140 is mounted.

The slicing head broadly indicated by the numeral 158 comprises a frame in all material respects like that heretofore described in conjunction with the structure illustrated in Figs. 1–10. The head is supported by forward leg members 160 and rear leg members 162 which are secured in suitable fashion to the side walls of the frame of the slicing head. The upper ends of legs 160 are pivotally secured to the side walls of the frame as indicated at 164 and the lower end of each leg is pivoted at 166 between the ends of a pair of levers 168. These levers 168 are pivoted at their midpoints to a hanger 170 secured to the bed frame 144 and depending therebelow, the opposite ends of said levers being pivoted by means of a pin as indicated at 172 to the lower extremity of a link 174.

Concaved seats 163 are formed at the upper ends of rear legs 162 for receiving enlarged heads 165 on the lower ends of posts 167 which are threaded through flanges on the side walls of the frame. Posts 167 are held in adjusted position by nuts 176 and the lower ends of legs 162 are pivoted as indicated at 178 between a pair of levers 180. Levers 180 are pivoted at their midpoints to the lower extremity of hangers 182 as indicated at 184 and the opposite ends of said levers are pivoted by means of pin 172 to the lower extremity of link 174.

To the upper end of link 174 is pivoted one end of a link 186, the other end of this link being secured to a shaft 188 in such manner that the link and the shaft rotate as a unit. The linkage arrangement at the opposite end of shaft 188, which lies outside the opposite side wall of the frame of the slicing head, is precisely the same as has been described above, this construction being clearly illustrated in the schematic view afforded by Fig. 13.

Secured to shaft 188 at one end for rotation therewith is an actuating link 190 and the end of a threaded adjusting screw 192 is adapted to bear upon the upper edge of this link. The adjusting screw is threaded through a collar 194 secured to the bed frame 144 and may be actuated by a knurled hand wheel 196.

From the foregoing description the means for elevating and dropping the slicing head will be apparent. Upon rotation of the hand wheel 196, the end of threaded member 192 will move downwardly forcing with it the actuating link 190 and thus rotating the shaft 188. Rotation of shaft 188 on downward movement of actuating link 190 rocks levers 168 and 180 about their fulcrums at the lower ends of hangers 170 and 182, forcing the outer ends of said levers upwardly and with them the legs 160 and 162 which support the head.

On rotation of the hand wheel 196 in the opposite direction the weight of the head will force the outer ends of levers 168 and 180 downwardly as the head drops, actuating link 190 being held in engagement with the end of adjusting screw 192 as the same moves upwardly during rotation of hand wheel 196.

To compensate for the slight arc traveled by the outer and inner ends of levers 168 and 180 during their pivotal movement about hangers 170 and 182, these levers may be slotted to provide lost motion at their pivotal engagements with pins 166 and 178 and at their pivotal engagement with pin 172 through which they are connected to link 174. This elevation adjustment enables the head to be positioned so that the discs are correctly located for properly slicing rolls of varying height or thickness. Threaded posts 167 provide for fine adjustment of elevation at the rear of the slicing head and, by virtue of the gravity support thereof on legs 162, the entire head may be moved upwardly about pivots 164 to provide ready access to the slicing discs and the driving mechanism therefor which lie inside the walls of the slicing head frame.

As described in conjunction with the arrangement illustrated in Figs. 1–9, the spindle of a large horizontal cutting disc 198 is journaled in a bearing 200 positioned centrally of the head in a transverse direction and the spindles of two smaller horizontally positioned slicing discs 202 and 204 are journaled in bearings 206 and 208 located in transvere alignment adjacent one another rearwardly of the larger disc bearing 200. The spindles of discs 198, 202 and 204 are removable from their respective bearings and also adjustable as to height, as heretofore described. They are driven by a V-belt 210 which passes around pulleys at the upper end of shafts likewise journaled in bearings 200, 206 and 208 and which engage the spindles of the horizontal discs. The V-belt is driven from a pulley 212 on the shaft of motor 214, all in a manner heretofore described in detail.

On the shaft of motor 214 is another pulley 216 which drives a belt 218 passing over vertically offset guide pulleys 220 and 222 to drive pulley 224 which is mounted on drive shaft 226 journaled transversely of the slicing head in the side walls of its frame.

Three drive pulleys 228, 230 and 232 are fixedly secured to shaft 226 for rotation therewith. These drive pulleys are spaced from one another in a manner to be described for a purpose which will be elaborated upon hereafter. A shaft 234 is rotatably journaled in the side walls of the frame of the slicing machine and a bifurcated arm 236 is secured to said shaft centrally thereof for rotation therewith. Rotatably journaled between the free ends of the arms of the bifurcation is a vertical slicing disc 238 with which is integrally associated a drive pulley 240. The drive pulley of this vertical slicing disc 238 is rotated by a belt passing around the pulley 240 and the central pulley 230 on shaft 226.

Transversely spaced vertical slicing discs 242 and 244 having pulleys integrally associated therewith as heretofore described are rotatably journaled between bifurcated arms 246 and 248, the ends of these arms being secured to shaft 250 for rotation therewith. Shaft 250 is rotatably journaled in the side walls of the frame of the slicing machine and these two vertical discs are driven by belts from pulleys 228 and 232 lying on opposite sides of pulley 230 and, like it, being secured to shaft 226 for rotation therewith.

Thus it will be seen that the vertical discs 238, 242 and 244 are all driven from the shaft of motor 214, as are the horizontally disposed discs 198, 202 and 204.

The vertically disposed discs may be elevated to any adjusted position or to inoperative position when not in use by means of crank arms 252 and 254, the former being secured to the end of shaft 234 which carries disc 238 and arm 254 being secured to the end of shaft 250 which carries the other two vertically disposed slicing discs. The free ends of crank arms 252 and 254, respectively, are provided with threaded pins 256 and 258 which are movable inwardly and outwardly from the adjacent side wall of the slicing machine frame to position the shafts 234 and 250 so that the slicing discs carried thereby may be held in any desired elevated position, usually in such position that the cluster is severed between each adjacent roll of a transverse row to a depth corresponding to the point where each roll is to be sliced subsequently by a horizontal disc. Under these circumstances rolls remain integrated in cluster form after slicing.

It will be apparent that, when large rolls are being partially severed and sliced, as illustrated in Fig. 14, only the large horizontally disposed disc 198 and the vertically disposed disc 238 will be in operation. At this time the spindles of the smaller horizontal discs 202 and 204 will have been removed from their bearings and vertical discs 242 and 244 will have been elevated by manipulating arm 254 so that they will not come in contact with the large rolls passing along on the conveyor 146 through the slicing head. The vertical disc 238 will first partially sever each pair of the cluster as it travels through the machine and subsequently the horizontal disc 198 will slice them as desired, either fully or partially to provide a hinge at one side, all as described in detail in conjunction with the embodiment disclosed in Figs. 1–9.

When operating on smaller rolls such as the frankfurter type, as illustrated in Fig. 15, the large horizontal disc 198 will have been removed from its bearing 200 and the single vertical disc on shaft 234 will have been elevated to preclude its engagement with the rolls passing through the machine. Vertical discs 242 and 244 are in position to sever, partially or wholly, each of the pairs of rolls forming the cluster being fed through the machine. After the severing operation the two horizontally disposed discs 202 and 204 will slice each roll of each pair precisely as described in conjunction with the embodiment of Figs. 1–9.

The belts by which the vertical knives are driven from shaft 226 are of the cylindrical rubber type, thus eliminating any need for disengaging the belts from the pulleys on which they are mounted when moving the vertical discs to elevated or lowered position. Under such circumstances the vertical discs are driven at all times regardless of the type of roll being severed and sliced, although of course only the large horizontal discs 194 or the pair of small horizontal discs 202 and 204 are mounted in operative position at one time.

As illustrated in conjunction with the earlier described embodiment, studded endless belts 260, of which there are four, are mounted on rollers 262 and 264 at each end of the frame, the forward set of rollers 262 being secured to drive shaft 266 which is rotatably journaled on the shaft and a sprocket wheel 270 secured for rotation therewith. The arm 268 may be spaced from the side wall of the frame by spacer 272 and separated from the sprocket wheel by a spacing member 274. Rotatably journaled in the outer or free end of arm 268 is a hub 276 integral with which are two sprocket wheels 278 and 280. Sprocket wheel 280 engages that portion of roller chain 150 lying between the idler sprocket 154 and the conveyor drive sprocket 156, being tensioned thereagainst by spring 281 with sufficient force to engage the chain and insure rotation of sprocket 280 with movement of chain 150 and consequent rotation of sprocket 278 which in turn actuates sprocket 270 to drive shaft 266 and the endless belt roller supports. Inasmuch as the diameters of conveyor sprocket 156 and sprockets 280, 278 and 270 are identical, as are the diameters of conveyor rollers 140 and 142 and the endless belt supporting rollers 262 and 264, the speed of rotation of all the sprockets and the driven rollers will be the same and consequently the linear speed of the endless conveyor 146 will be identical with the linear speed of the studded endless belts 260 which engage and penetrate the upper surface of the rolls supported by the endless conveyor as it moves through the slicing machine.

Furthermore, by reason of this arrangement the slicing head 158 may be elevated about pivots 164 without in any way interfering with the driving arrangement of either the conveyor 146 or the endless belts 260, thus facilitating rapid and facile mounting and dismounting of the horizontally disposed knives for handling rolls of different types.

While we have described a preferred embodiment of the arrangement for obtaining the improved results herein outlined, various modifications may be apparent to those skilled in the art and for that reason we wish to limit ourselves only within the scope of the appended claims.

What we claim is:

1. In a slicing machine for horizontally positioned clusters of integrated rolls the combination of a walled frame, a horizontal conveyor passing through the walls of said frame, means on said frame engageable with a cluster supported on the conveyor and movable in synchronism therewith for firmly positioning the cluster during its passage through the frame, vertical and horizontal knives rotatably journaled by said frame for first partially severing and then partially slicing from the line of severance the rolls of a cluster moving along with said conveyor, the vertical knife and the rotative axis of the horizontal knife lying in a single plane extending normal to and parallel with the longitudinal axis of the frame, and means for rotating said knives.

2. In combination with a longitudinally extending traveling conveyor for carrying articles to be sliced, a slicing machine comprising a frame supported to overlie said conveyor, a first shaft journaled in said frame for rotation about an axis normal to the surface of said conveyor and lying between opposite longitudinal margins thereof, a horizontal cutting disc secured to said first shaft and lying in a plane parallel to the conveyor surface and spaced therefrom, said horizontal disc lying wholly within the opposite longitudinal margins of the conveyor, movable gripping means carried by the frame movable on opposite sides of said first shaft in synchronism with the conveyor in a plane parallel to its surface and above the upper surface of the horizontal cutting disc for holding an article firmly on the conveyor as the disc passes through it, a second shaft journaled in said frame for rotation about an axis transversely of and parallel to the surface of said conveyor at a position above the space between said conveyor and said gripping means, and a vertical cutting disc secured to said second shaft and lying in a longitudinal plane normal to the surface of said conveyor which plane includes said first shaft, a portion of said vertical disc extending into the space between said conveyor and said gripping means to provide a vertical cut in material being sliced and thereby open a passage for said first shaft.

3. A slicing machine for use in conjunction with a longitudinally extending, traveling conveyor comprising a frame superimposing the conveyor, a first shaft journaled in said frame for rotation about an axis normal to the surface of said conveyor, a horizontal cutter disc secured to said shaft and lying in a plane parallel to and superposing the surface of said conveyor and wholly within the opposite longitudinal margins of the conveyor, spaced parallel means carried by the frame and overlying, respectively, opposed semi-circular portions of said horizontal disc for fixing the position of articles on the conveyor during its passage beneath the frame, a second shaft journaled in said frame for rotation about an axis transversely of and parallel to the surface of said conveyor at a position above the space between said conveyor and said spaced parallel means, and a vertical cutting disc secured to said second shaft and lying in a longitudinal plane normal to the surface of said conveyor which plane includes said first shaft, a portion of said vertical disc extending into the space between said conveyor and said spaced parallel means to provide a vertical cut in material being sliced and thereby open a passage for said first shaft.

4. In combination with a longitudinally extending, traveling conveyor for carrying articles to be sliced, a slicing machine comprising a frame supported to overlie said conveyor, a first shaft journaled in said frame for rotation about an axis normal to the surface of said conveyor and lying between opposite longitudinal margins thereof, a horizontal cutting disc secured to said shaft and lying in a plane parallel to the conveyor surface and spaced therefrom, said horizontal disc lying wholly within the opposite longitudinal margins of the conveyor, article holding means carried by the frame movable on opposite sides of said first shaft in synchronism with the conveyor in a plane parallel to its surface and above the upper surface of the horizontal disc for holding an article firmly on the conveyor as the disc passes through it, power means coupled with said conveyor for operating the same, means coupling said power means with said article holding means for operating the latter, a second shaft journaled in said frame for rotation about an axis transversely of and parallel to the surface of said conveyor at a position above the space between said conveyor and said holding means, and a vertical cutting disc secured to said second shaft and lying in a longitudinal plane normal to the surface of said conveyor which plane includes said first shaft, a portion of said vertical disc extending into the space between said conveyor and said gripping means to provide a vertical cut in material being sliced and thereby open a passage for said first shaft.

5. In an integrated roll cluster slicing machine for cutting into a longitudinal joint between adjacent rolls and for then slicing the rolls between the tops and bottoms thereof, the combination of a base structure, longitudinally extending roll holding means mounted on said base structure for holding said cluster in predetermined longitudinal alignment including a first engaging means having a surface for engaging the bottom of said cluster and a second engaging means having a surface parallel to and spaced from said first engaging means for engaging the top of said cluster, moving means operatively engaging and longitudinally moving at least one of said engaging means to cause longitudinal movement of said cluster, slicing means mounted on said base structure including a rotatable shaft journaled in said base structure for rotation about an axis normal to the surfaces of said holding means and extending into the space between said engaging means at a predetermined location corresponding with the location of said longitudinal joint of said longitudinally aligned cluster, and a slicing disc secured to said shaft and lying in a plane parallel to and between said surfaces for simultaneously slicing adjacent rolls on opposite sides of said shaft in a plane between the tops and bottoms thereof, and cutting means mounted on said base structure including a cutting knife in the space between said surfaces and in the same longitudinal plane normal to said surfaces as said shaft to cut into said longitudinal joint and open a path for passage of said shaft.

6. In an integrated roll cluster slicing machine as defined in claim 5 and wherein said moving means includes means operatively engaging the other of said engaging means for moving said other engaging means in synchronism with said one engaging means.

7. In an integrated roll cluster slicing machine as defined in claim 5 and including adjusting means mounted on said base structure including means operatively engaging said slicing means for adjusting the position of said slicing disc and including means operatively engaging said cutting means for adjusting the position of said cutting knife between said surfaces.

8. In an integrated roll cluster slicing machine for cutting into a longitudinal joint between adjacent rolls and for then slicing the rolls between the tops and bottoms thereof, the combination of a base structure, longitudinally extending roll holding means mounted on said base structure for holding said cluster in predetermined longitudinal alignment including a first engaging means having a surface for engaging the bottom of said cluster and a second engaging means having a surface parallel to and spaced from said first engaging means for engaging the top of said cluster, moving means operatively engaging and longitudinally moving at least one of said engaging means to cause longitudinal movement of said cluster, slicing means mounted on said base structure including a first rotatable shaft journaled in said base structure for rotation about an axis normal to the surfaces of said holding means and extending into the spce between said engaging means at a predetermined location corresponding with the location of said longitudinal joint of said longitudinally aligned cluster, and a slicing disc secured to said first shaft and lying in a plane parallel to and between said surfaces for simultaneously slicing adjacent rolls on opposite sides of said shaft in a plane between the tops and bottoms thereof, and cutting means mounted on said base structure including a second rotatable shaft journaled in said base structure for rotation about an axis transversely of and parallel to said surfaces at a position outside the space between said surfaces, and a cutting disc secured to said second shaft and lying in the same longitudinal plane normal to said surfaces as said first shaft to cut into said longitudinal joint and open a path for passage of said first shaft.

9. In an integrated roll cluster slicing machine for cutting into a longitudinal joint between adjacent rolls and for then slicing the rolls between the tops and bottoms thereof, the combination of a base structure, longitudinally extending roll holding means mounted on said base structure for holding said cluster in predetermined longitudinal alignment including a lower engaging means having a surface for engaging the bottom of said cluster and an upper engaging means having a surface parallel to and spaced from said lower enaging means for engaging the top of said cluster, moving means operatively engaging and longitudinally moving at least one of said engaging means to cause longitudinal movement of said cluster, horizontal slicing means mounted on said base structure including a vertical rotatable shaft journaled in said base structure for rotation about an axis normal to the surfaces of said holding means and extending into the space between said engaging means at a predetermined location corresponding with the location of said longitudinal joint of said longitudinally aligned cluster, and a horizontal slicing disc secured to said vertical shaft and lying in a plane parallel to and between said surfaces for simultaneously slicing adjacent rolls on opposite sides of said shaft in a plane between the tops and bottoms thereof, and vertical cutting means mounted on said base structure including a horizontal rotatable shaft journaled in said base structure for rotation about an axis transversely of and parallel to said surfaces at a position outside the space between said surfaces, and a vertical cutting disc secured to said horizontal shaft and lying in the same longitudinal plane normal to said surfaces as said vertical shaft to cut into said longitudinal joint and open a path for passage of said vertical shaft.

10. In an integrated roll cluster slicing machine for cutting into a longitudinal joint between adjacent rolls and for then slicing the rolls between the tops and bottoms thereof, the combination of a base structure, longitudinally extending roll holding means mounted on said base structure for holding said cluster in predetermined longitudinal alignment including a first engaging means having a surface for engaging the bottom of said cluster and a second engaging means having a surface parallel to and spaced from said first engaging means for engaging the top of said cluster, moving means operatively engaging and longitudinally moving said engaging means in synchronism to cause longitudinal movement of said cluster, slicing means mounted on said base structure including a rotatable shaft journaled in said base structure for rotation about an axis normal to the surfaces of said holding means and extending into the space between said engaging means at a predetermined location corresponding with the location of said longitudinal joint of said longitudinally aligned cluster, and a slicing disc secured to said shaft and lying in a plane parallel to and between said surfaces for simultaneously slicing adjacent rolls on opposite sides of said shaft in a plane between the tops and bottoms thereof, cutting means mounted on said base structure including a second rotatable shaft journaled in said base structure for rotation about an axis transversely of and parallel to said surfaces at a position outside the space between said surfaces, and a cutting disc secured to said second shaft and lying in the same longitudinal plane normal to said surfaces as said first shaft to cut into said longitudinal joint and open a path for passage of said first shaft, and adjusting means mounted on said base structure including means operatively engaging said slicing means for adjusting the position of said slicing disc and including means operatively engaging said cutting means for adjusting the position of said cutting disc.

References Cited in the file of this patent

UNITED STATES PATENTS

| | | |
|---|---|---|
| 109,295 | Brown | Nov. 15, 1870 |
| 343,314 | Hellings et al. | June 8, 1886 |
| 1,736,992 | Anderson | Nov. 26, 1929 |
| 1,747,461 | Vaughan | Feb. 18, 1930 |
| 1,953,558 | Harrild et al. | Apr. 3, 1934 |
| 2,114,096 | Noel | Apr. 12, 1938 |
| 2,234,841 | Holmes | Mar. 11, 1941 |
| 2,255,048 | Ewald | Sept. 9, 1941 |
| 2,260,832 | Deutscher | Oct. 28, 1941 |
| 2,347,007 | Tod | Apr. 18, 1944 |
| 2,465,670 | Urschel et al. | Mar. 29, 1949 |

FOREIGN PATENTS

| | | |
|---|---|---|
| 120,300 | Great Britain | Nov. 7, 1918 |
| 523,146 | Germany | Apr. 20, 1931 |